(12) United States Patent
Sun et al.

(10) Patent No.: US 11,874,946 B2
(45) Date of Patent: Jan. 16, 2024

(54) DATABASE MAP RESTRUCTURING FOR DATA SECURITY

(71) Applicant: International Business Machines Corporation, Armonk, NY (US)

(72) Inventors: ShengYan Sun, Beijing (CN); Shuo Li, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 16/985,308

(22) Filed: Aug. 5, 2020

(65) Prior Publication Data

US 2022/0043930 A1   Feb. 10, 2022

(51) Int. Cl.
  *G06F 21/00*   (2013.01)
  *G06F 21/62*   (2013.01)
  *G06F 16/22*   (2019.01)

(52) U.S. Cl.
  CPC ...... *G06F 21/6227* (2013.01); *G06F 16/2282* (2019.01)

(58) Field of Classification Search
  None
  See application file for complete search history.

(56) References Cited

U.S. PATENT DOCUMENTS

| 8,165,221 | B2 | 4/2012 | Zheng et al. | |
| 2002/0165853 | A1 | 11/2002 | Gogolak | |
| 2011/0261049 | A1* | 10/2011 | Cardno | G06Q 40/04 |
| | | | | 345/419 |
| 2012/0150826 | A1 | 6/2012 | Retnamma et al. | |
| 2012/0173226 | A1* | 7/2012 | McEvoy | G06F 16/221 |
| | | | | 707/802 |
| 2015/0324606 | A1* | 11/2015 | Grondin | G06F 3/0482 |
| | | | | 726/1 |
| 2016/0026708 | A1* | 1/2016 | Prasanna Kumar | G06F 16/285 |
| | | | | 707/737 |
| 2016/0034442 | A1* | 2/2016 | Levy | H04L 67/565 |
| | | | | 709/203 |
| 2016/0210064 | A1 | 7/2016 | Dornemann et al. | |
| 2017/0337398 | A1* | 11/2017 | Braun | G06F 21/6254 |
| 2017/0351745 | A1* | 12/2017 | Guo | G06F 16/22 |
| 2018/0075115 | A1* | 3/2018 | Murray | G06F 16/248 |
| 2018/0189607 | A1* | 7/2018 | Cocias | G06F 18/28 |

(Continued)

OTHER PUBLICATIONS

Wikipedia, Principal component analysis, dated Aug. 3, 2020, pp. 1-28, downloaded from the Internet on Feb. 21, 2023, URL: https://en.wikipedia.org/w/index.php?title=Principal_component_analysis&oldid=971040099 (Year: 2020).*

(Continued)

*Primary Examiner* — Andrew J Steinle
(74) *Attorney, Agent, or Firm* — Stosch Sabo

(57) ABSTRACT

A method, system, and computer program product for providing data security through database map restructuring are provided. The method identifies related data tables within a set of data tables within a database. The method identifies a set of related data types within the related data tables. A set of similarities is determined among the set of related data types. The related data types are mapped based on the set of similarities. Based on the mapping, method restructures one or more data tables of the set of data tables to generate a restructured data table.

6 Claims, 6 Drawing Sheets

(56) References Cited

U.S. PATENT DOCUMENTS

| | | | |
|---|---|---|---|
| 2019/0180199 A1* | 6/2019 | Bobroff | G06N 20/20 |
| 2020/0145296 A1* | 5/2020 | Avery | H04L 43/026 |
| 2021/0160262 A1* | 5/2021 | Bynum | H04L 43/16 |
| 2022/0192525 A1* | 6/2022 | Franck | A61B 8/488 |

OTHER PUBLICATIONS

Christen, "A Survey of Indexing Techniques for Scalable Record Linkage and Deduplication," IEEE Transactions on Knowledge and Data Engineering, vol. 24, Issue: 9, Sep. 2012, Date of Publication: Jun. 16, 2011, 19 pages.

Mell et al., "The NIST Definition of Cloud Computing", Recommendations of the National Institute of Standards and Technology, Special Publication 800-145, Sep. 2011, 7 pages.

* cited by examiner

DATABASE MAP RESTRUCTURING FOR DATA SECURITY

BACKGROUND

Databases may be established as either relational databases or non-relational databases. Relational databases may be structured as a Structured Query Language (SQL) Database. SQL databases may be vertically scalable and use a pre-defined schema for document types and data held within the database. SQL databases use structured queries to access information within the database. Non-relational databases may not use SQL structure and thus be understood as non-relational or not only SQL (NoSQL) databases. NoSQL databases may use distributed database management systems. NoSQL databases may be horizontally scalable and use dynamic schema or organizational structures. Additionally, NoSQL databases can be used in hierarchical data storage. NoSQL databases may also use unstructured query languages or queries having a structure that differs from SQL queries.

SUMMARY

According to an embodiment described herein, a computer-implemented method for providing data security through database map restructuring is provided. The method identifies related data tables within a set of data tables within a database. The method identifies a set of related data types within the related data tables. A set of similarities is determined among the set of related data types. The related data types are mapped based on the set of similarities. Based on the mapping, method restructures one or more data tables of the set of data tables to generate a restructured data table.

According to an embodiment described herein, a system for providing data security through database map restructuring is provided. The system includes one or more processors and a computer-readable storage medium, coupled to the one or more processors, storing program instructions that, when executed by the one or more processors, cause the one or more processors to perform operations. The operations identify related data tables within a set of data tables within a database. The operations identify a set of related data types within the related data tables. A set of similarities is determined among the set of related data types. The related data types are mapped based on the set of similarities. Based on the mapping, the operations restructure one or more data tables of the set of data tables to generate a restructured data table.

According to an embodiment described herein, a computer program product for providing data security through database map restructuring is provided. The computer program product includes a computer-readable storage medium having program instructions embodied therewith, the program instructions being executable by one or more processors to cause the one or more processors to identify related data tables within a set of data tables within a database. The computer program product identifies a set of related data types within the related data tables. A set of similarities is determined among the set of related data types. The related data types are mapped based on the set of similarities. Based on the mapping, the computer program product restructures one or more data tables of the set of data tables to generate a restructured data table.

DETAILED DESCRIPTION

Figure 1:
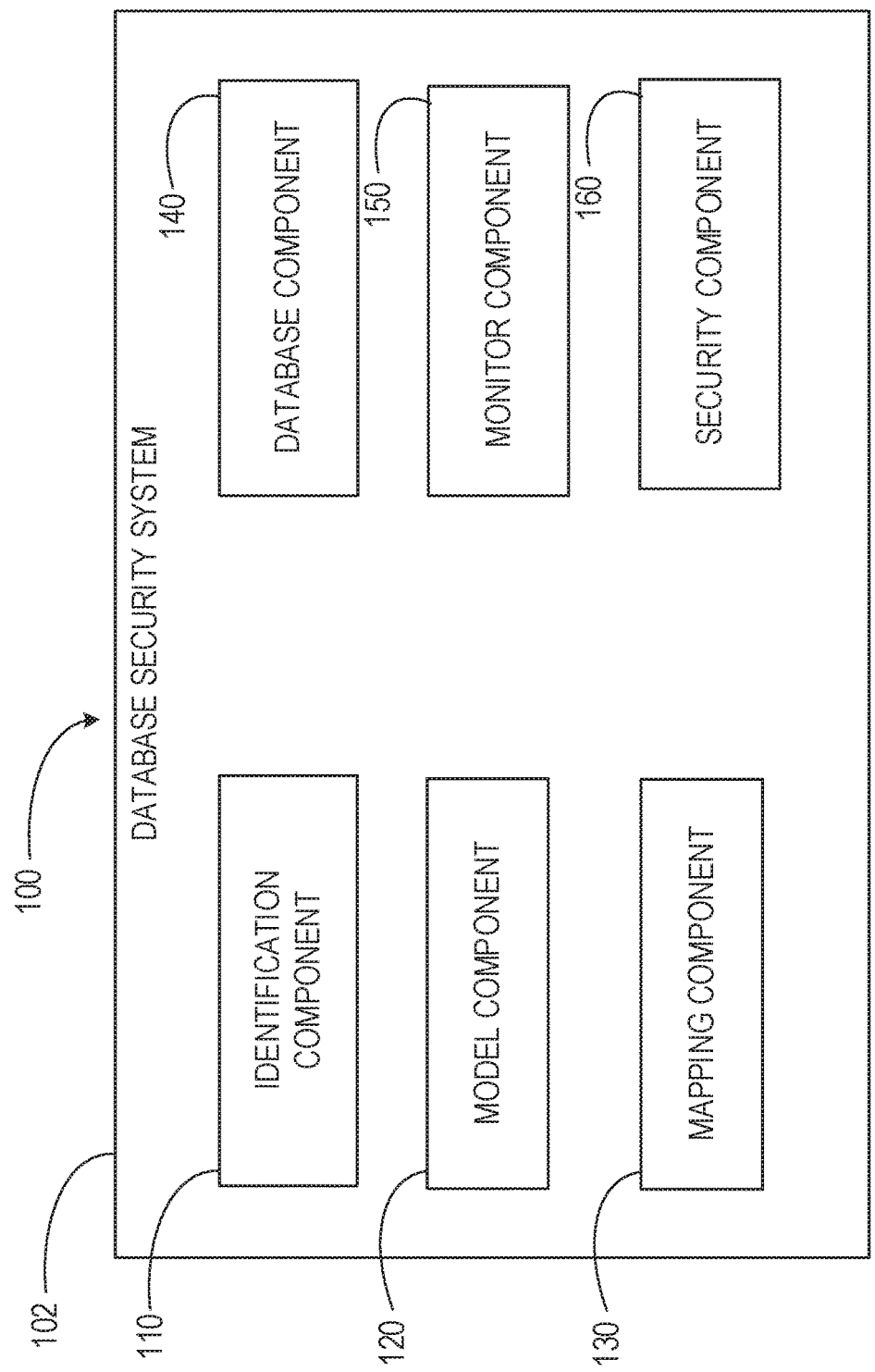
FIG. 1 depicts a block diagram of a computing environment for implementing concepts and computer-based methods, according to at least one embodiment.

The present disclosure relates generally to methods for data security. More particularly, but not exclusively, embodiments of the present disclosure relate to a computer-implemented method for providing data security by restructuring database maps to prevent interpretation of key data sets through communication interception. The present disclosure relates further to a related system for database map restructuring, and a computer program product for operating such a system.

Relational and non-relational databases are used in a variety of applications. Industries or organizations can use databases to provide users with resources for performing job functions. Network-based computing, over the Internet and/or in use with cloud computing, can provide users with access to databases of varying type to provide resources, services, and products from numerous organizations, entities, or third parties. Access to databases for remote users may be provided through communication between users and databases transmitted across communications networks and resources, such as the Internet.

As databases are more frequently used, more and more processes are collected, processed, distributed, and, in some cases, centrally managed. As a result, large amounts of relatively low-value information may be stored in log files and transmitted across communications networks. Further, relatively high-value data, with sensitive or high compliance requirements, are transferred across these communications networks. Transmission of high-value data across communications networks and storage of high-value data on databases can involve additional security measures. Such security measures for high-value data may include, for example, encrypting data that is stored on databases and/or securing data transmitted across communications networks. Systems often employ encryption to provide data security while high-value data is stored on a database and for transmissions including high-value data. However, despite such encryption, the interception of packets transmitted between a remote user and a database may enable an attacker to discern relationships between data structures within a database. Further, interception of communicated packets may include key column data from packets after data relationships have been discerned.

Embodiments of the present disclosure can provide analytic-based data security for high-value data. The present disclosure determines related columns within data structures stored within a database. The related columns may define or represent a relationship between high-value data stored within the database. Embodiments of the present disclosure restructure data structures or portions thereof for related columns, data, or data types. Embodiments of the present disclosure enable retention of communication between the database and end users or applications in a previous style. The restructured database may obfuscate explicit relationships in data packages to achieve data security during transmission. Some embodiments of the present disclosure combine encryption with database restructuring. Further, some embodiments of the present disclosure can employ automated self-modification of security policies. The security policies may be modified to update security rules based on field mapping and data table restructuring. The updated security rules may be modified based on field mapping changes within the restructured data tables.

Some embodiments of the present disclosure use principal component analysis to identify vector methods to analyze redundant or related data tables. The present disclosure can use sampling methods to determine related or redundant data types within the redundant or related data tables. Based on the related data tables and related data types, the present disclosure modifies or restructures data tables within the database. Embodiments of the present disclosure calculate data mapping with existing security policies and update or modify existing security policy rules corresponding to restructured data tables.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a database security system 102. The database security system 102 may comprise an identification component 110, a model component 120, a mapping component 130, a database component 140, a monitor component 150, and a security component 160. The identification component 110 identifies related data tables and related data types within the related data tables. The model component 120 determines similarities among the related data tables. The mapping component 130 maps the related data types based on the similarities. The database component 140 restructures one or more data tables of a set of data tables within a database to generate a restructured data table. The monitor component 150 monitors traffic of related data tables for a period of time. The security component 160 modifies security policy conditions based on identified relationships and similarities of data types and data tables. Although described with distinct components, it should be understood that, in at least some embodiments, components may be combined or divided, and/or additional components may be added without departing from the scope of the present disclosure.

Figure 2:
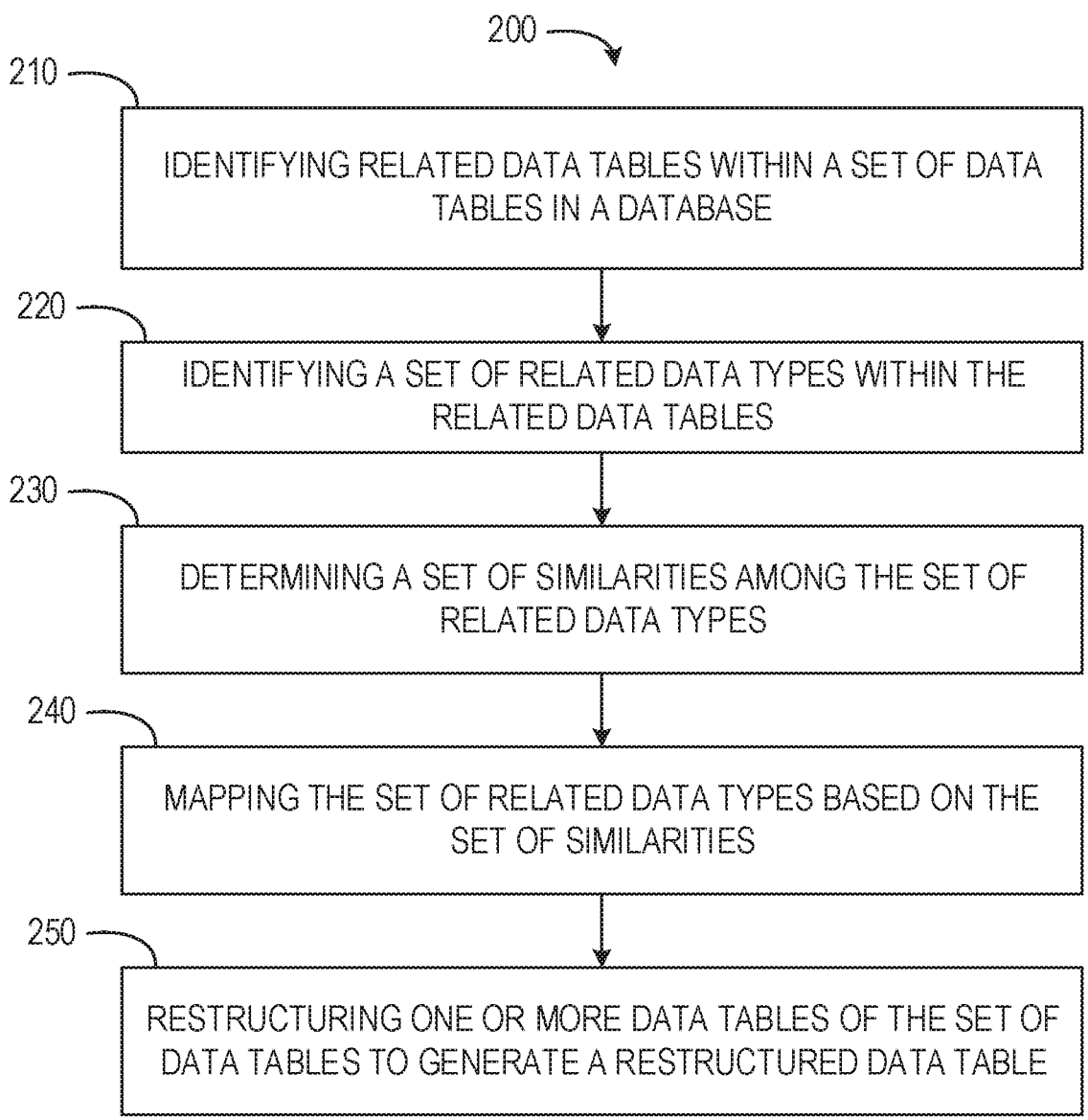
FIG. 2 depicts a flow diagram of a computer-implemented method for providing data security through database map restructuring, according to at least one embodiment.

Referring now to FIG. 2, a flow diagram of a computer-implemented method 200 is shown. The computer-implemented method 200 is a method for providing data security through database map restructuring. In some embodiments, the computer-implemented method 200 may be performed by one or more components of the computing environment 100, as described in more detail below.

At operation 210, the identification component 110 identifies related data tables. The related data tables may be identified within a set of data tables within a database. In some embodiments, the related data tables are identified by principal component analysis. The identification component may determine and select principal components for each data table. The principal components may be understood as a subset of data elements, data types, characteristics, or other aspects of the set of data tables. The selected principal components may be selected based on a frequency of co-occurrence within the set of data tables. In some instances, principal components are selected based on frequency of co-occurrence within a data stream or communications network accessing data within the set of data tables. The related data tables may be identified as data tables having co-occurring principal components above a co-occurrence threshold.

In some embodiments, the related data tables are a set of related data tables. The set of related data tables may include a subset of data tables selected from the set of data tables. The set of related data tables may be formed from a plurality of related data tables, such as a plurality of pairs of related data tables.

At operation 220, the identification component 110 identifies a set of related data types. The set of data types may be identified within the related data tables identified in operation 210. In some embodiments, the set of related data types are identified using principal component analysis. The identification component 110 may identify the set of related data types as principal components identified for related data tables in operation 210.

In some embodiments, the identification component 110 analyzes data types from the related data tables to determine principal components for the related data tables. The identification component 110 may also analyze network traffic between one or more users or destination devices and databases associated with the data tables. The identification component 110 may determine, from the network traffic, the principal components of the data table which indicate links or relationships between the related data tables. The principal components may represent co-occurring data types within the related data tables. The co-occurring data types may indicate redundancies, distributed data, related data, related data structures, hierarchical relationships, combinations thereof, relating two or more data tables. A frequency of co-occurrence of a data type between related data tables may indicate a closeness or nature of the relationship of the related data tables.

At operation 230, the model component 120 determines a set of similarities among the set of related data types. The model component 120 may determine the set of similarities based on values, characteristics, or aspects of the related data types. The model component 120 may determine the set of similarities based on usage or access of the set of related data types. The model component 120 may determine the set of similarities based on a period of time elapsed for the usage or access of the set of related data types.

In some embodiments, the model component 120 generates a similarity model between each related data type of a set of related data types. The model component 120 may generate the similarity model based on database catalog table information (p1), potential data types (ps), approximate groups with a vector method (po), and a period of time. The period of time may be a period of time over which database traffic occurs. The model component 120 may split and drill down to activities, table objects, and fields (p2). In some embodiments, the model component 120 generates the similarity model using a function as shown in Equation 1.

$$Rs_b{}^a = \Sigma p1, p2, ps, po \qquad \text{Equation 1}$$

The model component 120 may sample network traffic using cross checks to determine redundancy or relatedness of data columns and data column relationships. The model component 120 may sample the results of the similarity model as shown in Equation 2.

$$Rr_b{}^a = \text{sample.random}(Rs_b{}^a) \qquad \text{Equation 2}$$

The monitor component 150 monitors traffic of the related data tables for a period of time. The monitor component 150 may provide data, characteristics, or measuring metrics associated with data or network traffic monitored during the period of time to the model component 120.

The model component 120 determines one or more relationships among related data types of the set of related data types. The one or more relationships may be determined based on similarity models for the set of related data types and the traffic of the related data table for the period of time. The model component 120 using the similarity model, the sampling equation, and the performance estimation described above.

The model component 120 may remove a subset of related data types from the set of related data types based on the traffic of the related data tables for the period of time. The model component 120 may generate a performance estimate (pp) for each pair of fields or data types. The model component 120 may remove high cost pairs which have an effect on computing performance above a defined performance threshold. In some embodiments, the model component 120 chooses a specified type of the related data types to perform normalization.

At operation 240, the mapping component 130 maps the set of related data types based on the set of similarities. In some embodiments, the set of related data types are mapped to change preexisting data columns using a designated link for each related data type of the set of related data types. The mapping component 130 receives indications of relatedness of data types from the model component 120 and the identification component 110. The mapping component 130 determines column relationships within a current iteration of data tables associated with the set of related data types. The mapping component 130 uses parsed object and field information for the related data types for objects associated with the related data types.

At operation 250, the database component 140 restructures one or more data tables of the set of data tables to generate a restructured data table. The database component 140 may restructure the one or more data tables based on the mapping generated in operation 240. In some embodiments, the database component 140 cooperates with the mapping component 130 to modify one or more of a column position, a data table position, a row position, and a monitored field list to change one or more positions of the set of related data types or data/objects associated with at least one of the set of related data types. The monitored field list may be a set of fields, associated with related data types, which is monitored by databases or data tables to identify and recall requested data based on receipt of a request. In some embodiments, the mapping component 130 updates the monitored field list to reflect the restructuring of the one or more data tables.

In some embodiments, the database component 140 restructures the one or more data tables using the similarity model, the sampled relationships, and the performance estimate. The database component 140 may restructure the one or more data tables, at least in part, based on the high cost pairs, determined among the related data tables. The database component 140 may restructure the one or more data tables using a precision link instead of actual or real data columns. In some embodiments, the database component 140 restructures the one or more data tables as shown in Equation 3.

$$Rn_{(a,j)}{}^1 = Rr_b{}^a \Sigma p1, p2, ps, po, pp \qquad \text{Equation 3}$$

Figure 3:
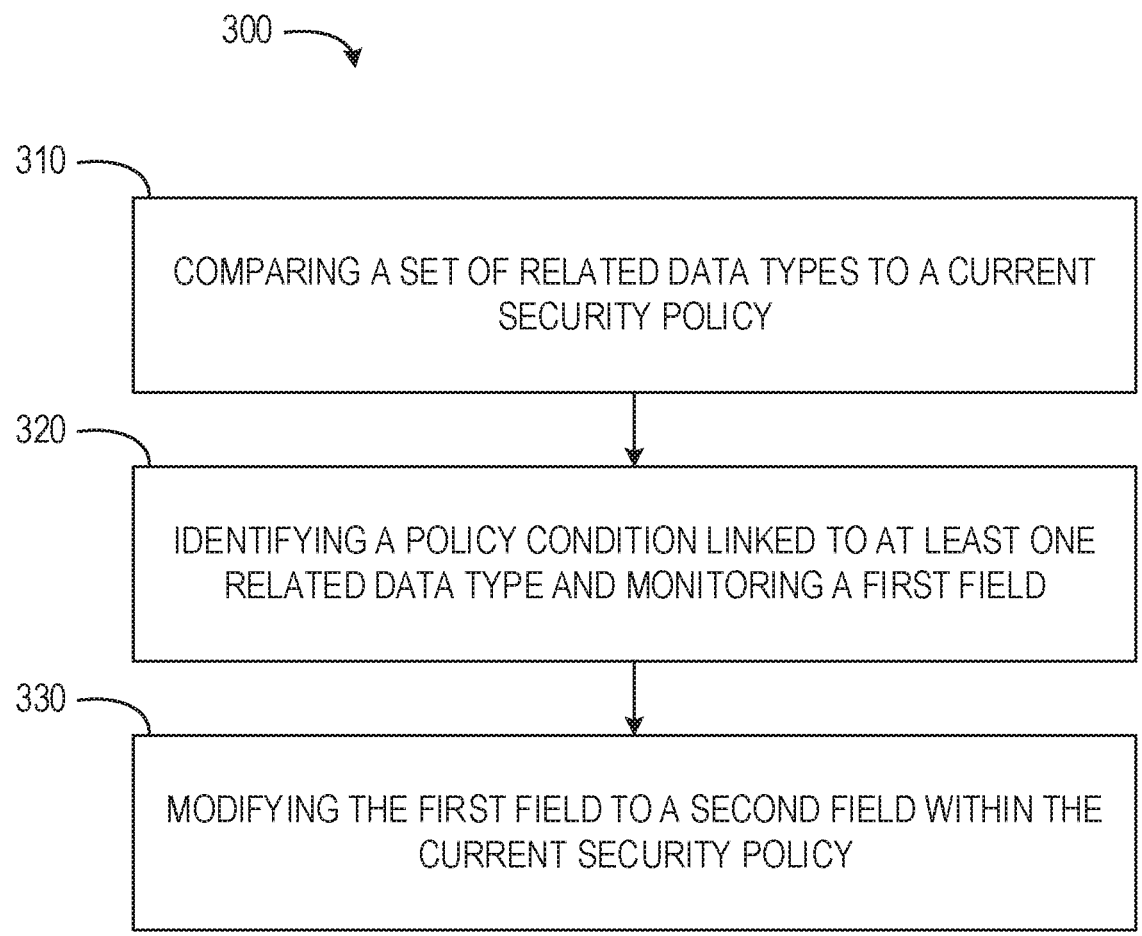
FIG. 3 depicts a flow diagram of a computer-implemented method for providing data security through database map restructuring, according to at least one embodiment.

FIG. 3 shows a flow diagram of a computer-implemented method 300 for providing data security through database map restructuring, according to at least one embodiment. The method 300 may be performed by or within the computing environment 100. In some embodiments, the method 300 comprises or incorporates one or more operations of the method 200. In some instances, operations of the method 300 may be incorporated as part of or sub-operations of the method 200, such as operations 240 and 250.

In operation 310, the security component 160 compares the set of related data types to a current security policy. The current security policy may include linked policy conditions for accessing data or data types within data tables stored on a specified database or set of databases. The security component 160 may compare the current security policy by accessing one or more security policy rule definitions and a database catalog of data types or database objects. The database catalog may be synchronous with a database containing related data tables including at least a portion of the set of related data types. Based on the current security policy and the catalog, the security component 160 may determine a corresponding get column relationship from the database for one or more of the related data types.

In operation 320, the security component 160 identifies a policy condition linked to at least one related data type. The policy condition may monitor a first field within a data table of the set of data tables. Linked policy conditions may reference database objects to be accessed based on information within a request. Linked policy conditions may also reference database objects to trigger security validations when accessing a database or data table.

In operation 330, the security component 160 modifies the first field to a second field within the current security policy. The second field may be associated with the at least one related data type in a restructured data table. The security component 160 may identify a column mapping within the current security policy. The column mapping may reference the first field to be accessed based on a request containing specified information. The security component 160 may access the maps of related data types generated in operations 240 and 250 for the restructured data tables. The security component 160 may also access a monitored fields list for the restructured data tables. The security component 160 may then modify the first field to the second field to cause the current security policy to match the mapping of the restructured data tables. Once modified, the security policy causes the monitor component 150 and the database component 140 to monitor different fields, based on the restructured data tables and the mapping, to access objects or data types within the related data tables and obfuscate relationships between data types and data tables.

Although described above with respect to specified embodiments and modifications, the security component 160 may modify the current security policy based on the mapping, described in operation 240, and the restructuring, described in operation 250. The security component 160 may modify the current security policy in any suitable and relevant manner, relative to the present description.

Figure 4:
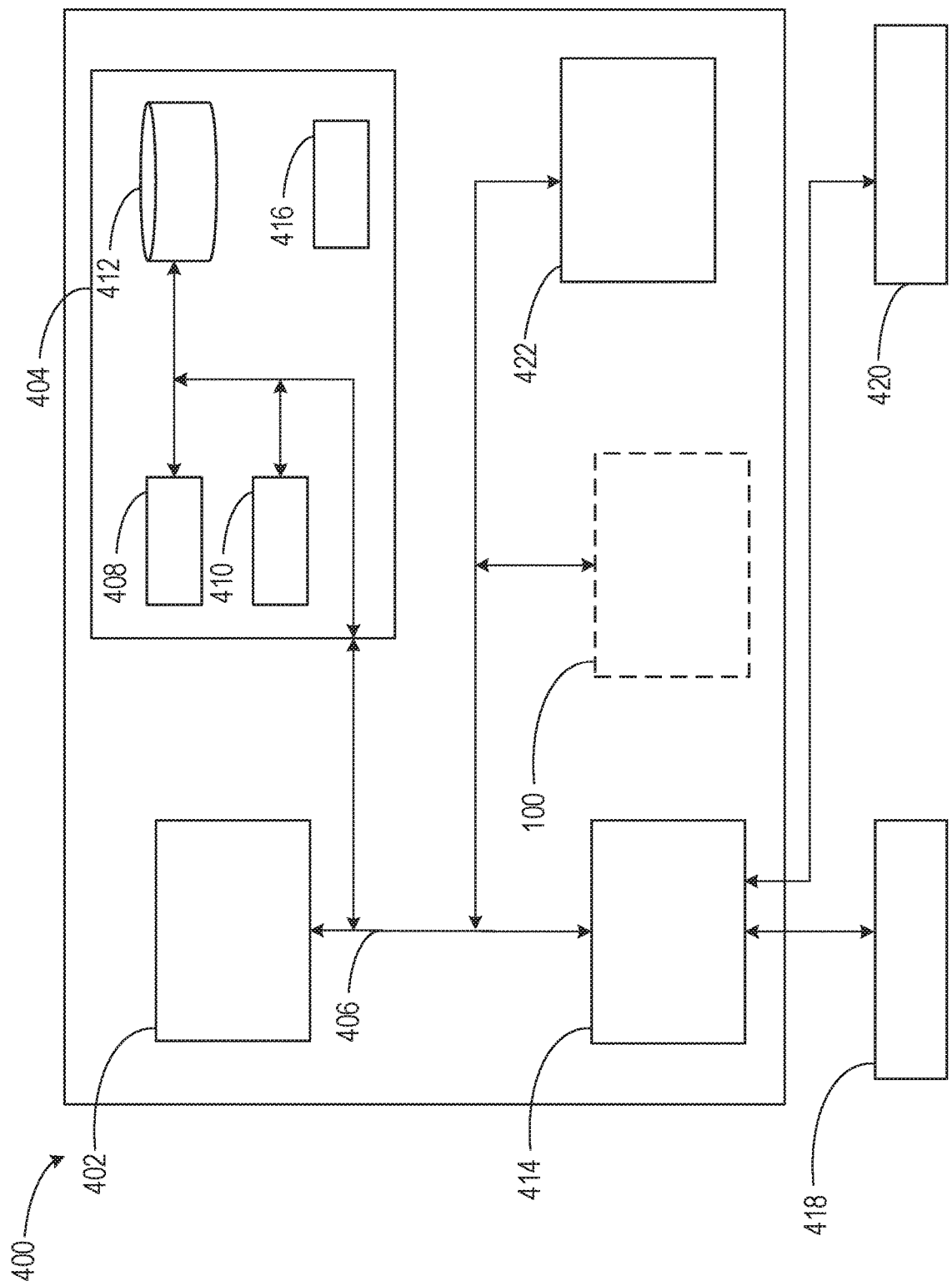
FIG. 4 depicts a block diagram of a computing system for providing data security through database map restructuring, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for providing data security through database map restructuring.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the identification component 110, the model component 120, the mapping component 130, the database component 140, the monitor component 150, and the security component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
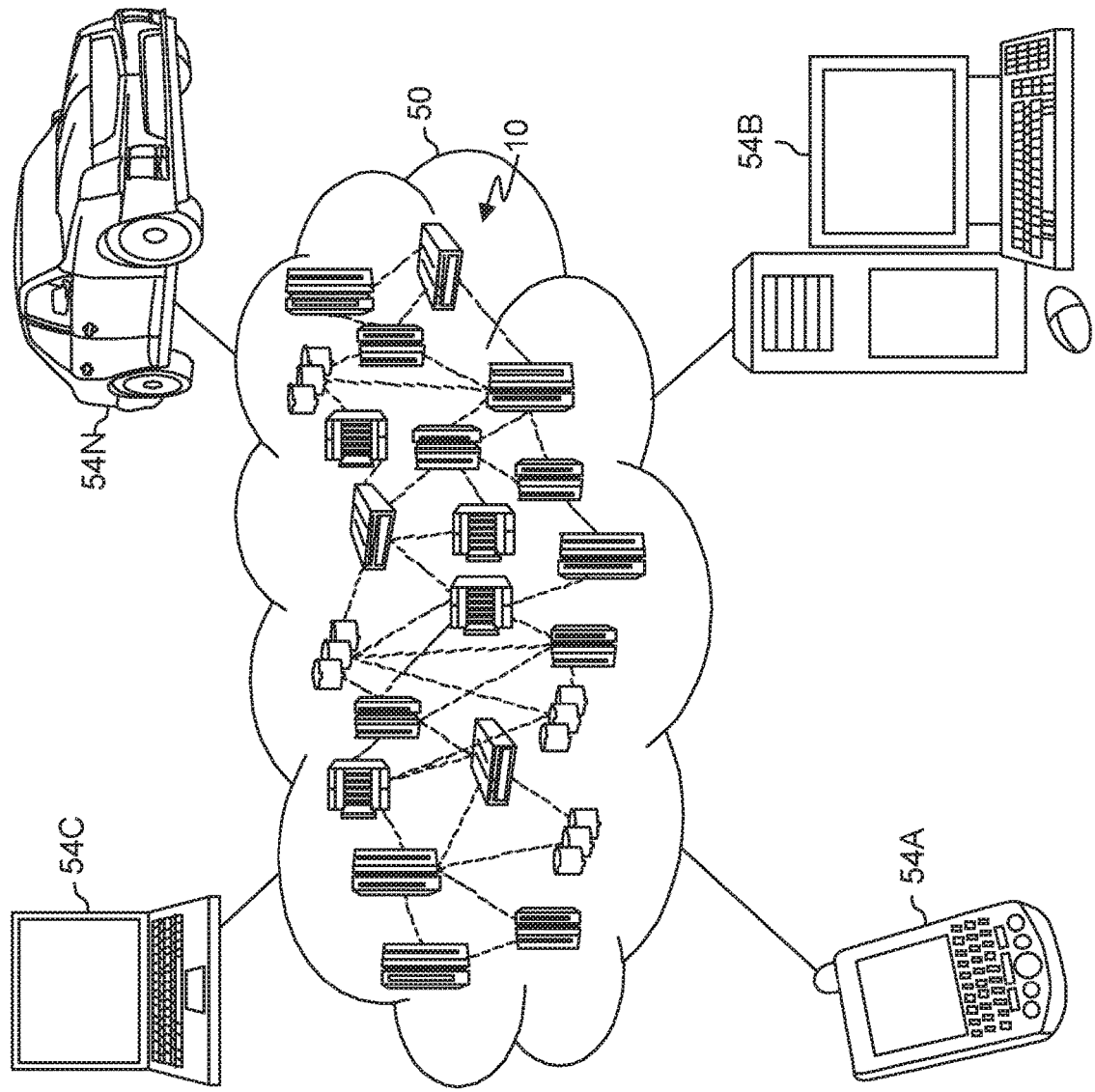
FIG. 5 is a schematic diagram of a cloud computing environment in which concepts of the present disclosure may be implemented, in accordance with at least one embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
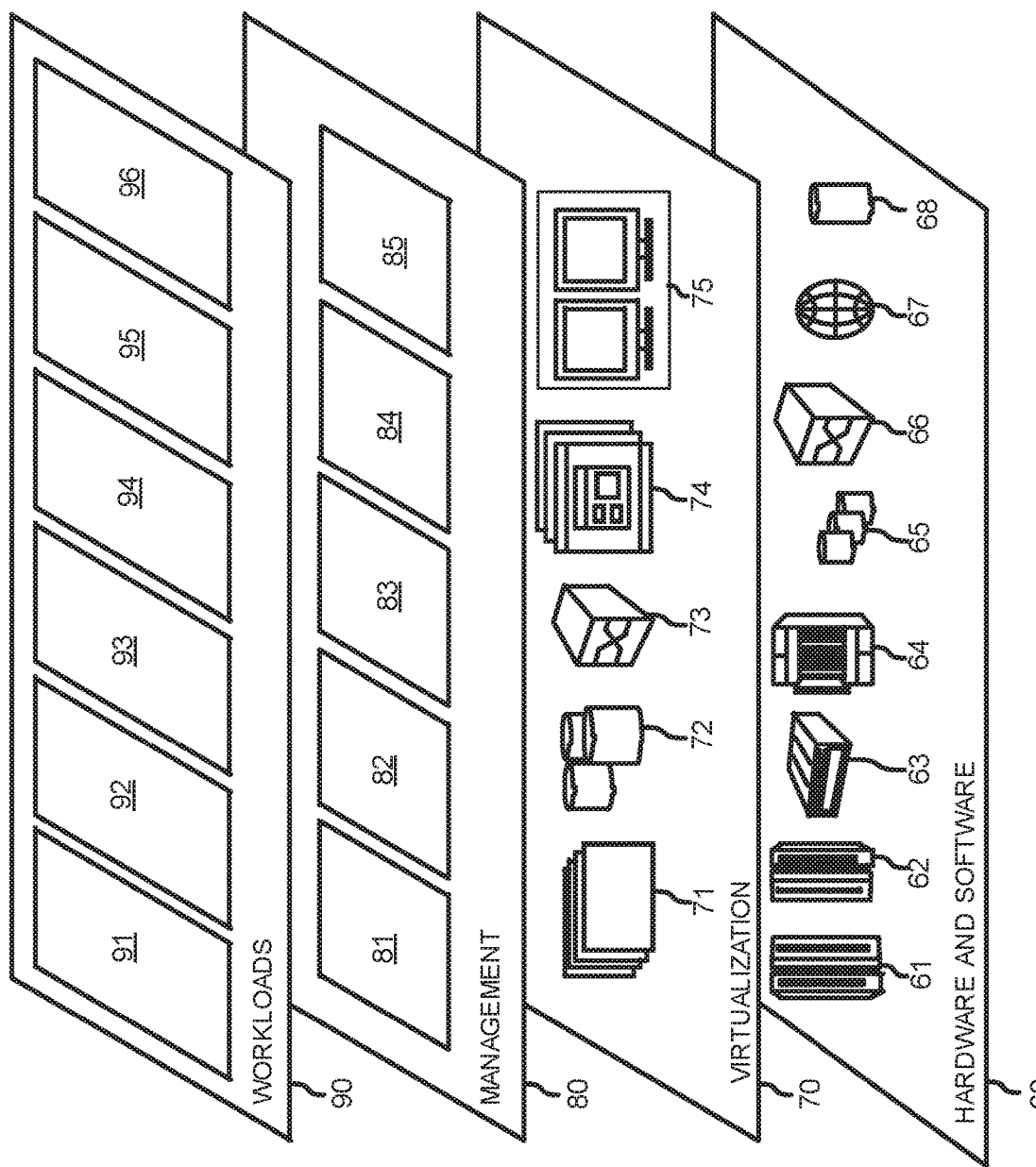
FIG. 6 is a diagram of model layers of a cloud computing environment in which concepts of the present disclosure may be implemented, in accordance with at least one embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database restructuring processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying related data tables within a set of data tables within a database using principal component analysis, wherein the principal component analysis is based on a frequency of co-occurrence within the set of data tables and another frequency of co-occurrence of communication networks accessing data within the set of data tables, and wherein the related data tables have co-occurring principal components above a co-occurrence threshold;
    identifying a set of related data types within the related data tables;
    determining a set of similarities among the set of related data types;
    mapping the related data types based on the set of similarities;
    based on the mapping, restructuring one or more data tables of the set of data tables to generate a restructured data table, wherein the restructuring alters a column position, a data table position, and a row position of the one or more data tables;
    comparing the set of related data types to a current security policy;
    based on the mapping and the restructuring, modifying the current security policy by:
        identifying a policy condition linked to at least one related data type, the policy condition monitoring a first field within a data table of the set of data tables; and
        modify the first field to a second field within the current security policy, the second field associated with the at least one related data type in the restructured data table; and
    updating a monitored field list based on the restructured data table, wherein the monitored field list comprises a set of fields respectively associated with the related data types.

2. The method of claim 1, wherein the set of related data types are mapped to change preexisting data columns using a designated link for each related data type of the set of related data types.

3. A system, comprising:
    one or more processors; and
    a computer-readable storage medium, coupled to the one or more processors, storing program instructions that, when executed by the one or more processors, cause the one or more processors to perform operations comprising:

identifying related data tables within a set of data tables within a database using principal component analysis, wherein the principal component analysis is based on a frequency of co-occurrence within the set of data tables and another frequency of co-occurrence of communication networks accessing data within the set of data tables, and wherein the related data tables have co-occurring principal components above a co-occurrence threshold;

identifying a set of related data types within the related data tables;

determining a set of similarities among the set of related data types;

mapping the related data types based on the set of similarities; and based on the mapping, restructuring one or more data tables of the set of data tables to generate a restructured data table, wherein the restructuring alters a column position, a data table position, and a row position of the one or more data tables;

comparing the set of related data types to a current security policy;

based on the mapping and the restructuring, modifying the current security policy by:
  identifying a policy condition linked to at least one related data type, the policy condition monitoring a first field within a data table of the set of data tables; and
  modify the first field to a second field within the current security policy, the second field associated with the at least one related data type in the restructured data table; and updating a monitored field list based on the restructured data table, wherein the monitored field list comprises a set of fields respectively associated with the related data types.

4. The system of claim 3, wherein the set of related data types are mapped to change preexisting data columns using a designated link for each related data type of the set of related data types.

5. A computer program product comprising a computer readable storage medium having program instructions embodied therewith, the program instructions being executable by one or more processors to cause the one or more processors to perform operations comprising:
  identifying related data tables within a set of data tables within a database using principal component analysis, wherein the principal component analysis is based on a frequency of co-occurrence within the set of data tables and another frequency of co-occurrence of communication networks accessing data within the set of data tables, and wherein the related data tables have co-occurring principal components above a co-occurrence threshold;

identifying a set of related data types within the related data tables;

determining a set of similarities among the set of related data types;

mapping the related data types based on the set of similarities; and based on the mapping, restructuring one or more data tables of the set of data tables to generate a restructured data table, wherein the restructuring alters a column position, a data table position, and a row position of the one or more data tables;

comparing the set of related data types to a current security policy;

based on the mapping and the restructuring, modifying the current security policy by:
    identifying a policy condition linked to at least one related data type, the policy condition monitoring a first field within a data table of the set of data tables; and
    modify the first field to a second field within the current security policy, the second field associated with the at least one related data type in the restructured data table; and updating a monitored field list based on the restructured data table, wherein the monitored field list comprises a set of fields respectively associated with the related data types.

6. The computer program product of claim 5, wherein the set of related data types are mapped to change preexisting data columns using a designated link for each related data type of the set of related data types.

* * * * *